Jan. 16, 1951          H. L. SPENCER          2,538,736
TRAILER
Filed Oct. 23, 1944                                3 Sheets-Sheet 1
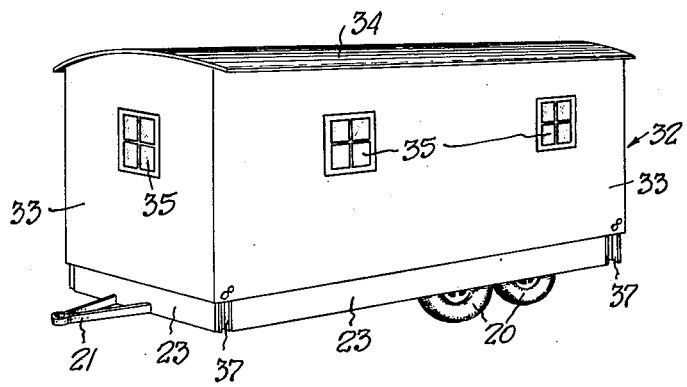
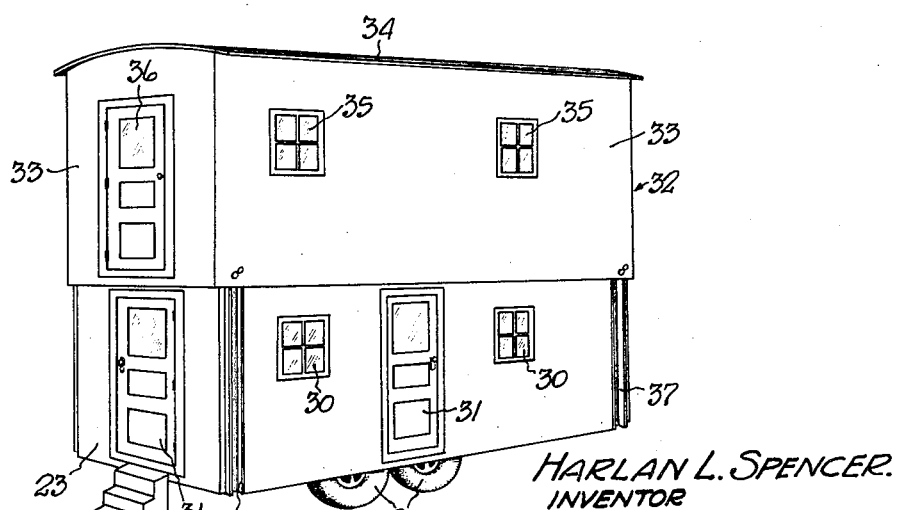
HARLAN L. SPENCER.
INVENTOR
BY Altach & Knoblock.
ATTORNEYS Jan. 16, 1951  H. L. SPENCER  2,538,736
TRAILER Filed Oct. 23, 1944  3 Sheets-Sheet 2

HARLAN L. SPENCER.
INVENTOR

BY Oltsch & Knoblock
ATTORNEYS

Jan. 16, 1951 H. L. SPENCER 2,538,736
TRAILER
Filed Oct. 23, 1944 3 Sheets-Sheet 3
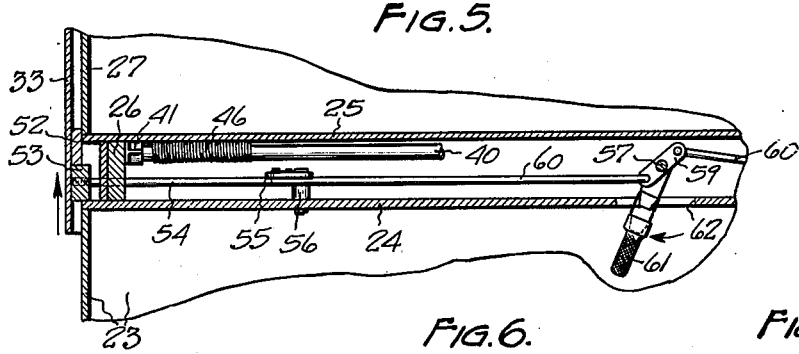
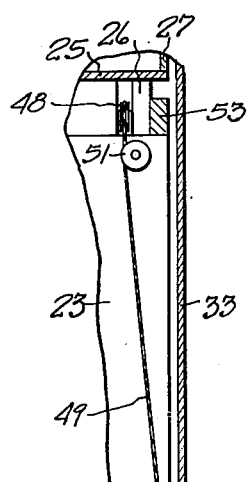
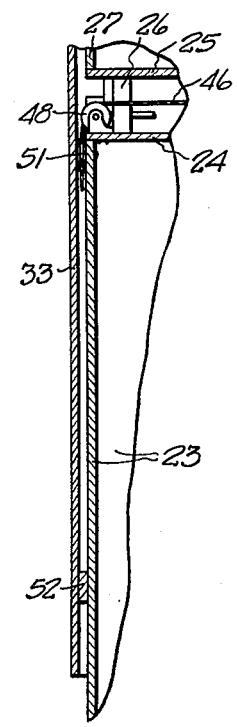
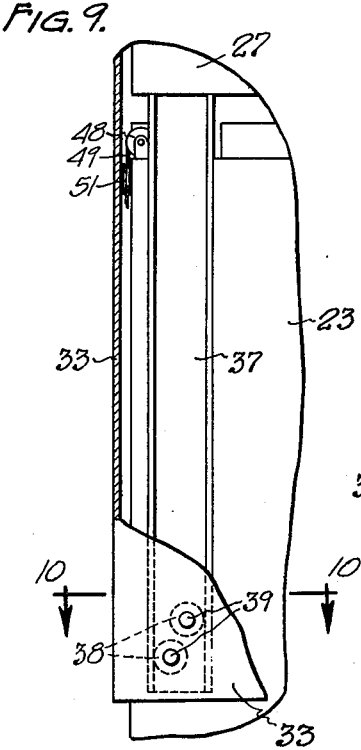
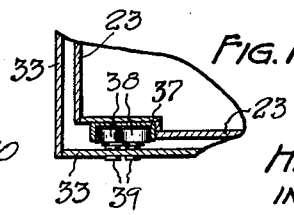
HARLAN L. SPENCER.
INVENTOR
BY Oltsch & Knoblock
ATTORNEYS Patented Jan. 16, 1951

2,538,736

UNITED STATES PATENT OFFICE 2,538,736

TRAILER

Harlan L. Spencer, Syracuse, Ind.; Effie P. Spencer and The National Bank and Trust Company, South Bend, Ind., coadministrators of said Harlan L. Spencer, deceased Application October 23, 1944, Serial No. 560,001

10 Claims. (Cl. 296—23)

This invention relates to improvements in trailers. More particularly, it relates to those trailers which are known as house trailers.

House trailers provide compact living quarters having accepted utility and comfort, but provide limited accommodations. They commonly provide cooking, sleeping and general living accommodations, but are limited in dimension by the factors of mobility and road clearance, so that they generally provide quarters for only two or three persons. More specifically, the width of a trailer is limited by the factors of average road width and by laws pertaining to vehicles; the height is limited by clearances at underpasses along roads, by practical considerations of stability and balance which are important in a vehicle to insure against overturning thereof, and also by law in some cases; and the length of the trailer is limited by practical considerations such as maneuverability, and also by law in some cases.

The primary object of this invention is to provide a trailer construction which will be within the limitations aforementioned when moving, but which is extensible while stationary to provide increased living accommodations as compared to other trailers of the same size as the instant device when it is retracted.

A further object is to provide a collapsible trailer having a novel telescopic arrangement of upper and lower sections and novel means for extending and retracting the same.

A further object is to provide a trailer formed of telescoping upper and lower parts with means for effectively bracing and supporting the upper part when elevated.

A further object is to provide a trailer formed of telescoping upper and lower parts with means for guiding relative telescoping movement of the parts.

A further object is to provide a trailer formed of telescoping upper and lower parts with means for effectively sealing the parts against weather while in extended position.

A further object is to provide a trailer formed of telescoping upper and lower parts with means for raising and lowering the upper part and separate means for locking and supporting the upper part when in elevated operative position.

Other objects will be apparent from the description, drawings and appended claims.

In the drawings:

Fig. 1 is a perspective view of the trailer in retracted or collapsed adjustment;

Fig. 2 is a perspective view of the trailer in extended adjustment;

Fig. 5 is an enlarged fragmentary vertical sectional view illustrating the relation of certain of the trailer parts when extended;

Fig. 6 is an enlarged fragmentary detail vertical sectional view of the trailer extending means;

Fig. 7 is an enlarged fragmentary detail vertical sectional view similar to Fig. 6 but illustrating the trailer parts in extended position;

Fig. 8 is an enlarged fragmentary detail vertical sectional view taken at right angles to Fig. 6;

Fig. 9 is a fragmentary side view of the trailer with parts broken away; and

Fig. 10 is a horizontal sectional view taken on line 10—10 of Fig. 9.

Figure 3:
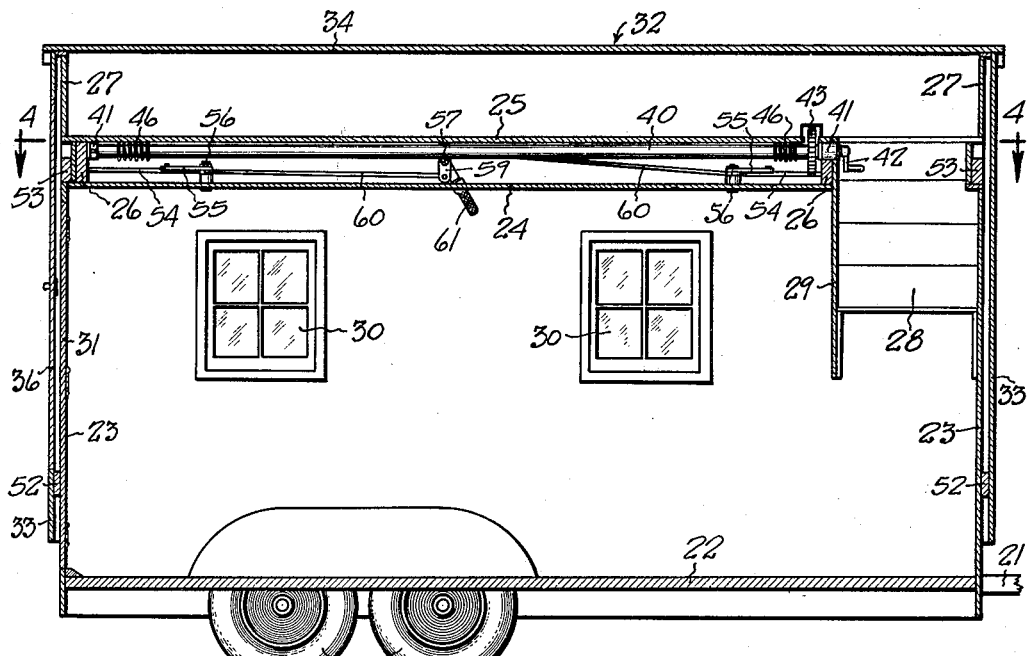
Fig. 3 is a longitudinal vertical sectional view of the trailer taken on line 3—3 of Fig. 4.
Figure 4:
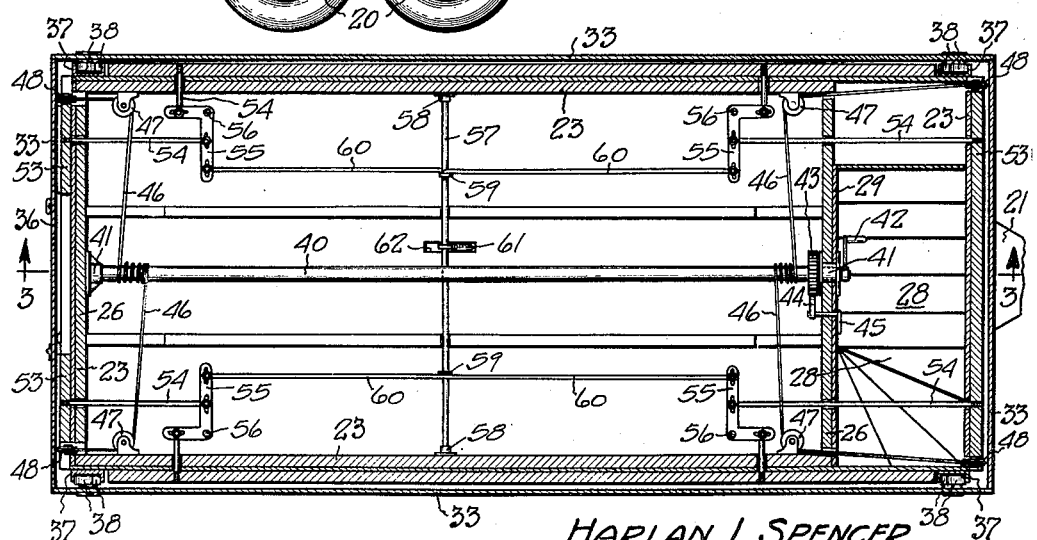
Fig. 4 is a longitudinal horizontal sectional view of the trailer taken on line 4—4 of Fig. 3.

Referring to the drawings, and particularly to Figs. 1 to 10 which illustrate one embodiment of the invention, the numeral 20 designates the wheels having any suitable or conventional mounting or connection with a frame or chassis of the trailer. Any desired type of hitch 21 carried by said chassis may be provided for connection of the trailer to a tractive vehicle. The body of the trailer is secured upon the chassis and comprises a floor 22, side and end walls 23, a ceiling 24 and a second horizontal panel 25 spaced above the ceiling and forming a floor for the second story of the vehicle. Transverse beams 26 span the side walls to support the panel 25. The side and end walls preferably project above panel 25 at 27. A stairway 28 is provided at one end of the body separated from the main body compartment by a wall 29. Ceiling 24 and panel 25 are open to provide a stair well. The body also includes the usual windows 30 and one or more doors 31.

An upper body portion 32, including side and end walls 33 and a roof 34, fits telescopically upon and around the main body portion with suitable clearance for vertical movements relative thereto. In the lowered or retracted position of the upper body portion, the roof thereof rests marginally upon the upper edges of the upper portions 27 of the main body. Windows 35 are provided in the upper body portion and are preferably so located that they register with windows 30 in the main body portion when the upper portion is in its lowered position. Likewise, the upper portion may be provided with a door 36 which is located to register with one of the doors 31 to afford access into the trailer when in its collapsed or retracted position.

The main body portion is provided with a vertical channel 37 adjacent to each corner, as at each end of each side wall. A plurality of sets of guide rollers 38 are journaled on stub shafts 39 secured to the side walls of the upper trailer section 32. The rollers 38 bear against the flanges of channels 37 and serve to guide the upper body section 32 in its raising and lowering movements, and, preferably, two vertically spaced sets of rollers cooperate with each channel 37.

A long shaft 40 is journaled for rotation in bearings 41 supported by the beams 26, whereby the shaft is positioned between the ceiling panel 24 and the floor panel 25 and is thus concealed. One end of the shaft projects through partition 29 and is shaped to detachably mount an operating crank 42. A ratchet wheel 43 may be mounted on the shaft adjacent partition 29 for engagement with a pawl 44 pivoted in said partition and controlled by a lever 45 or the like positioned adjacent to the crank for manipulation simultaneously with the operation of the crank. The pawl serves as means for locking the shaft 40 in selected rotative position. One end of each of a pair of cables 46 is secured to and thence wound around the shaft 40 at each end thereof. The cables pass around sheaves or pulleys, as 47 and 48, located in the space between panels 24 and 25, and then extend downwardly in runs 49 which are secured at 50 to the bottoms of the adjacent vertical walls 33 of upper body section 32. Each cable run 49 engages a pulley 51 journaled to a vertical wall 23 of the main body section in spaced relation below the outer pulley 48 around which said cable is trained. The arrangement is such that when the upper body section 32 is fully elevated the cable run 49 will be substantially horizontal as shown in Fig. 7. This provides a tensioned cable connection between the main and upper body sections which prevents upward as well as downward movement of the upper trailer section and thus anchors said upper body section in alignment with the lower body section and prevents dislodgment thereof, as in heavy winds. The tensioning arrangement is made possible by the location and arrangement of pulleys 51, as is apparent from Fig. 7.

A horizontal cleat 52 is solidly secured to each vertical wall of upper section 32 in spaced relation above the bottom thereof. These cleats are preferably of a thickness substantially equal to the spacing between adjacent walls of the main and upper body sections and serve with the channels 37 and rollers 38 to prevent lateral play of said body parts. Rigid bars 53 are supported at and extend along the margins of ceiling panel 24 and are normally positioned as illustrated in Fig. 3 between panels 24 and 25 with their outer faces normally positioned inwardly of the planes of the inner faces of the adjacent cleats 52. Bars 53 are preferably secured adjacent to their ends to rigid rods 54 pivoted to bellcrank levers 55 which are pivoted at 56 to ceiling panel 24 and are confined in the space between panels 24 and 25. A cross rod 57 is journaled at 58 in the main body portion between panels 24 and 25 and mounts vertical levers 59 to whose opposite ends are pivoted rigid rods 60 which extend to and are pivotally connected with the respective bellcrank levers 55. An operating handle 61 is fixedly secured to the cross rod 57 and extends downwardly therefrom through an opening 62 in the ceiling panel for access interiorly of the main trailer body. The bars 53 are of such width that, when projected laterally outwardly upon manipulation of handle 62 and of the expanding spider formed of the rods and levers above described, they will span the spaces between the walls of the main and upper body sections and their inner margins will bear upon the outer margins of ceiling panel 24. Consequently, when the upper body section has been elevated to its operative extended position, bars 53 may be laterally projected and will underlie the cleats 52. This serves a dual purpose. First, it provides a support for the upper body section 32, thereby supplementing the locking and supporting function of the ratchet and pawl arrangement 43-44. Secondly, it provides a weather seal which prevents wind and rain from blowing through the passages between the main and upper body sections. Suitable corner seals, not shown, may also be provided, and will serve the functions of sealing the corners of the space between main and upper body sections and of guiding the movement and steadying the position of the upper body section.

The construction has been illustrated as constituting a two-story trailer when extended. Access to the interior of the trailer is afforded by the registering doors 31 and 36 of the two sections when the body is in collapsed or retracted position. The operation of the means for extending and retracting the trailer is performed conveniently at the interior thereof. The operating mechanism is all enclosed and so located that it does not interfere with normal movement within and usage of the trailer. The projection of the vertical wall parts 27 serves to solidly support the top section when collapsed, and provides clearance for beds and other items supported on floor panel 25. At the same time, the overall height of the trailer body when the top portion is collapsed does not greatly exceed that of conventional one-story trailers, so that no problem of clearance at road underpasses is involved. Also, the balance of the trailer when the body is retracted is good, so that no danger of overturning in normal careful driving is encountered.

The same principles of construction and operation can also be applied to a one-story trailer by mounting the cable operating shaft beneath the floor of the main body section, suitably locating guide pulleys for the cables at the upper end of the main body section, if a Dutch type or two section door is provided and if the height of all rigid and non-collapsible fittings and furniture is limited to the height of the main body section. Such a one-story collapsible vehicle has a low center of gravity compared to a conventional trailer, thereby facilitating travel at higher speeds than are now possible without danger.

I claim:

1. A trailer comprising a wheeled rigid main body section having a floor and vertical walls, a rigid upper section fitting around said main section and including vertical walls and a roof, means for raising and lowering said upper section between predetermined limits, a plurality of retractable members shiftably carried by the walls of said main section for supporting said upper section at said upper predetermined position, and means for simultaneously and equally shifting said members between retracted and supporting positions.

2. A trailer comprising a wheeled rigid main body, having a floor and vertical walls, a rigid upper section fitting around said main section and including vertical walls and a roof, means for shifting said upper section vertically between predetermined upper and lower positions, a plurality of rigid members shiftably supported by the walls of said main section and adapted to support said upper section at said upper predetermined position, a spider connecting said members, and means for actuating said spider to shift said members simultaneously between supporting and retracted positions.

3. A trailer comprising a wheeled rigid main body section having a floor, vertical walls, an interior stairwell and a pair of vertically spaced upper panels spanning said walls intermediate of the height thereof and interrupted at said stairwell, an upper body section fitting around said main body section and including vertical walls and a roof, means for raising and lowering said upper section between predetermined limits and including parts positioned between said upper panels, and an actuator positioned in said stairwell, and rectractible and extensible means positioned between said upper panels for supporting said upper section in said upper predetermined position when the retractible means is extended.

4. A trailer comprising relatively rigid top and bottom body sections telescopically associated for relative vertical movements with respect to one another, the bottom section including a floor and upwardly extending substantially vertical side and end walls surrounding said floor and the top section including a roof and substantially vertically depending side and end walls substantially surrounding said roof, means for extending and retracting said sections with respect to one another by relative vertical movements therebetween, means carried by and substantially coextensive with each of a pair of opposite walls of one of said sections and movable into and from interlocking engagement with a substantially coextensive part of the other section when said sections are in predetermined extended position for securing the sections in such extended position, and means for substantially simultaneously moving said securing means into and from interlocking engagement with said other section.

5. A trailer comprising relatively rigid top and bottom body sections telescopically associated with one another for relative vertical movements, the bottom section including a floor and upwardly extending substantially vertical side and end walls surrounding said floor and a ceiling structure including spaced panels spanning the area between the walls, and the top section including a roof and substantially vertically depending side and end walls substantially surrounding said roof, means for extending and retracting said sections with respect to one another by relative vertical movements therebetween, means carried by and substantially coextensive with each of a pair of opposite walls of one of said sections and movable into and from interlocking engagement with a substantially coextensive part of the adjacent wall of the other section when said sections are in predetermined extended position for securing the sections in such extended position, and means including mechanism disposed between said panels for substantially simultaneously moving such securing means into and from interlocking engagement with said other section.

6. A trailer comprising a wheeled main body section having a floor, vertical walls, an interior stairwell and a pair of spaced horizontal upper panels spanning said walls intermediate the height thereof and interrupted at said stairwell, an upper body section fitting around said main body section and including vertical walls and a roof, said upper section being supported in spaced relation above said panels by the upper ends of the walls of said main section, and means for shifting said upper section vertically, at least part of said shifting means being housed between the upper panels of said main body section.

7. A collapsible trailer comprising a wheeled main body section having an interior stairwell and vertically spaced top panels interrupted at said stairwell, a longitudinally extending shaft journaled in said body between said top panels and terminating in said stairwell, an upper body section having walls and a top and fitting telescopically around said main section, a plurality of cables secured at spaced points to the lower margin of the upper body section and secured to said shaft, and pulleys carried by said main body section for guiding said cables.

8. In a vertically extensible and collapsible vehicle of the character described including telescopically arranged upper and lower sections each having vertically directed side and end walls, structural means including a portion forming the ceiling of the lower section and a portion forming the floor of the upper section, said section portions being spaced apart to provide a compartment at the upper portion of the lower section, pulley means carried by said upper portion of the lower section adjacent to the junctures of the side and end walls thereof, cable means secured to the bottom portion of the upper section adjacent to the junctures of the side and end walls thereof and extending upwardly over said pulleys, windlass means disposed within said compartment at the upper portion of said lower section and secured to said cables intermediate of said pulleys for winding-up said cables whereby to raise said upper section relative to the lower section, and means accessible from within the lower section for operating said windlass means.

9. A trailer comprising a wheeled rigid main body section having a floor and vertical walls, a rigid upper section fitting around said main section and including vertical walls and a roof, means for shifting said upper section between predetermined upper and lower positions and including actuating means, a plurality of spaced, cooperative interlocking means carried by the body and upper sections and operable to lock the upper section in said predetermined upper position against downward movement, and manually operable means for operating said locking means simultaneously to lock and release the lock between said sections.

10. A trailer comprising a generally rectangular wheeled rigid main body section having a floor, a ceiling structure and enclosing side and end walls, a generally rectangular rigid upper section fitting around said main section and including vertical side and end walls and a roof, said ceiling structure providing a floor for the upper section and a compartment beneath said floor, windlass mechanism in said compartment, a pair of cables wound on said windlass the opposite end parts of each cable being secured at spaced places to lower portions of the upper section adjacent to the junctures of the side and end walls and extending between the outer wall surface of the lower section and the inner wall surface of the upper section, a plurality of pulleys mounted on said main body section, adjacent to said compartment, on substantially horizontal axes of rotation with one pulley engaging a cable part at a place adjacent to the passage of such cable part from the compartment to between said wall surfaces, each cable part running over one of said pulleys, and a second pulley beneath each of the first said pulleys and mounted on a horizontal axis substantially at right angles to the axis of the pulley thereabove and at a position between the first said pulley and the adjacent wall of the upper section and in relatively close proximity to the first said pulley, the respectively adjacent cable first running over the second pulley at that side of the axis thereof which is remote from the adjacent wall of the upper section.

HARLAN L. SPENCER.

REFERENCES CITED

The following references are of record in the file of this patent:

UNITED STATES PATENTS

| Number | Name | Date |
| --- | --- | --- |
| 1,852,984 | Smith | Apr. 5, 1932 |
| 1,964,894 | Rohne | July 3, 1934 |
| 2,055,930 | Josephs | Sept. 29, 1936 |
| 2,148,270 | Koets | Feb. 21, 1939 |
| 2,188,545 | Smelker | Jan. 30, 1940 |
| 2,193,352 | Thomas | Mar. 12, 1940 |
| 2,292,107 | Doepke | Aug. 4, 1942 |

FOREIGN PATENTS

| Number | Country | Date |
| --- | --- | --- |
| 14,657 | Great Britain | July 12, 1896 |
| 152,611 | Great Britain | Dec. 23, 1920 |
| 271,388 | Great Britain | May 26, 1927 |
| 275,829 | Great Britain | Aug. 18, 1927 |
| 461,624 | Great Britain | Feb. 19, 1937 |

Certificate of Correction

Patent No. 2,538,736                               January 16, 1951

HARLAN L. SPENCER

It is hereby certified that error appears in the printed specification of the above numbered patent requiring correction as follows:

Column 6, line 70, after the word "windlass" insert a comma; column 7, line 15, for "first" read *part*;

and that the said Letters Patent should be read as corrected above, so that the same may conform to the record of the case in the Patent Office.

Signed and sealed this 5th day of June, A. D. 1951.

[SEAL]

THOMAS F. MURPHY,
*Assistant Commissioner of Patents.*